Nov. 9, 1937.  E. C. WENTE  2,098,326
CALCULATING DEVICE
Filed April 10, 1935   2 Sheets-Sheet 1

INVENTOR
E. C. WENTE
BY
G. H. Heydt
ATTORNEY

Nov. 9, 1937.  E. C. WENTE  2,098,326

CALCULATING DEVICE

Filed April 10, 1935  2 Sheets-Sheet 2

INVENTOR
E.C.WENTE

BY

ATTORNEY

Patented Nov. 9, 1937

2,098,326

UNITED STATES PATENT OFFICE 2,098,326

CALCULATING DEVICE

Edward C. Wente, New York, N. Y., assignor to Bell Telephone Laboratories, Incorporated, New York, N. Y., a corporation of New York Application April 10, 1935, Serial No. 15,727

5 Claims. (Cl. 33—1)

This invention relates to calculating devices and particularly to devices for harmonic analysis.

The object of the invention is a device which will rapidly and accurately determine the magnitude and phase of the components of the Fourier series defining a given curve.

A feature of the invention is an electro-optical device for multiplying the ordinates of the given curve by the ordinates of a known modulating function.

Another feature of the invention is a device for rapidly varying the phase relation between a component of the given curve and the modulating function.

Another feature of the invention is an electro-optical device for integrating the product of the multiplication of the ordinates of the given curve by the ordinates of the modulating function.

In the drawings:

Fig. 1 represents one cycle of the given curve;

Fig. 2 diagrammatically shows a device embodying the invention;

Figure 1:
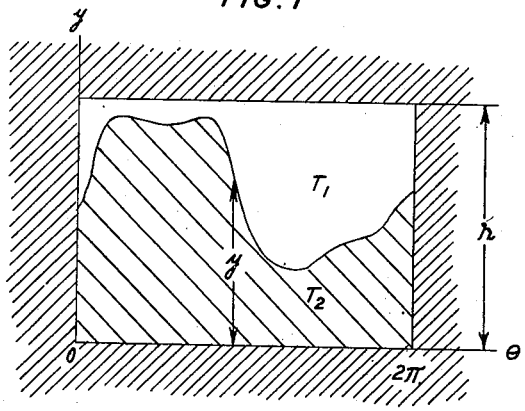

In Fig. 1, one cycle of the given curve is represented as a transparency, having a transmission which varies in accordance with the given curve. For convenience of illustration, this transparency has been shown as comprising a base having a uniform coefficient of light transmission $T_1$. The area of the base up to the given curve is darkened until it has a uniform coefficient of light transmission $T_2$.

If desired, the transmission of any vertical element of the transparency may vary in the vertical direction in any desired way, so long as the total transmission of the whole area of the various vertical elements varies laterally in accordance with the desired curve.

The given curve may be represented by the function $$y = f(\theta) \qquad (1)$$

in which the units of abscissae, $\theta$, are so chosen that $\theta$ has the values 0 and $2\pi$ at the two edges of the transparency. Let $h$ = the height of the transparency in centimeters $2\pi\alpha$ = the width of the transparency in centimeters.

If the transparency shown in Fig. 1 be uniformly illuminated by light of intensity $I$, the light transmitted by any vertical element having a width $d\theta$ will be $$L = \alpha I [T_1 h - (T_1 - T_2) y \, d\theta] \qquad (2)$$

The curve represented by Equation 1 may also be expressed by either of the Fourier series:

$$y = \sum_{n=0}^{n=\infty} C_n \cos(n\theta + \Phi_n) \qquad (3)$$

$$= \sum_{n=0}^{n=\infty} [A_n \sin n\theta + B_n \cos n\theta] \qquad (4)$$

in which $$A_n = -C_n \sin \Phi_n = \frac{1}{\pi} \int_0^{2\pi} y \sin n\theta \cdot d\theta$$

$$B_n = C_n \cos \Phi_n = \frac{1}{\pi} \int_0^{2\pi} y \cos n\theta \cdot d\theta$$

$$C_0 = \frac{1}{2\pi} \int_0^{2\pi} y \cdot d\theta$$

If the light transmitted through the first transparency, be transmitted through a second transparency having the coefficients of transmission for light varying in the horizontal direction, the light from any element of the first transparency will be reduced in proportion to the transmission of the aligned element of the second transparency. The light will thus be doubly modulated and the intensity of the light transmitted through any two aligned elements will be reduced in proportion to the product of the coefficients of transmission of the two elements. For convenience of calculation, it is preferable that in one of the aligned transparencies, the transmission of an element should be uniform in the vertical direction even though the transmission of the various elements varies laterally. It is immaterial which transparency is so limited, thus, in the discussion following the vertical elements of the second transparency or modulating screen will be assumed to have a coefficient of transmission for light which is constant in the vertical direction.

Let the transmission of the second transparency, or modulating screen, vary in the horizontal direction in accordance with the following relation $$\tau = \tau_o + \tau_n \sin(n\theta + \psi_n) \qquad (5)$$

Figure 3:
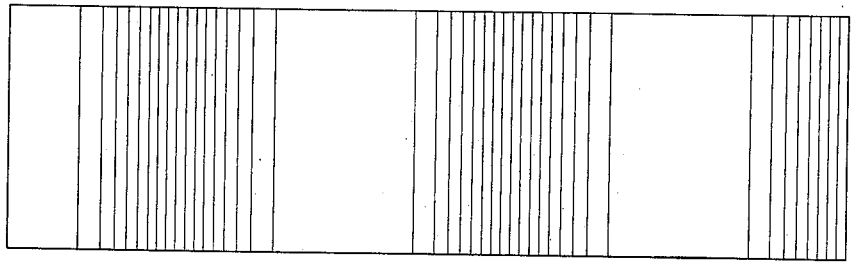
Fig. 3 shows a modulating screen for the second harmonic.
Figure 4:
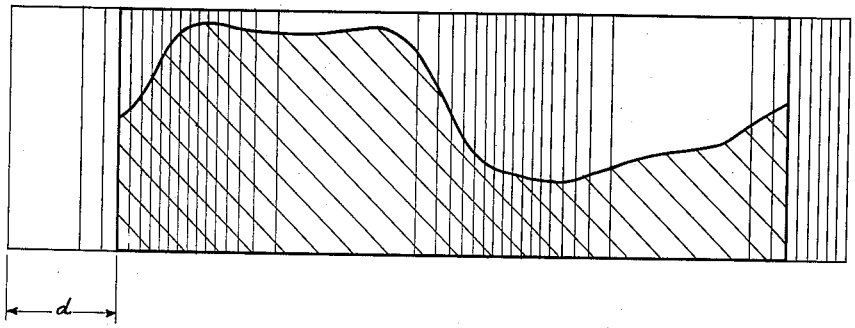
Fig. 4 shows the image of the given curve superimposed on the modulating screen.

Fig. 3 diagrammatically illustrates a modulating screen in which the transmission of any vertical element is constant, but the transmission of the various elements varies laterally in accordance with Equation 5, when $n=2$; that is, the

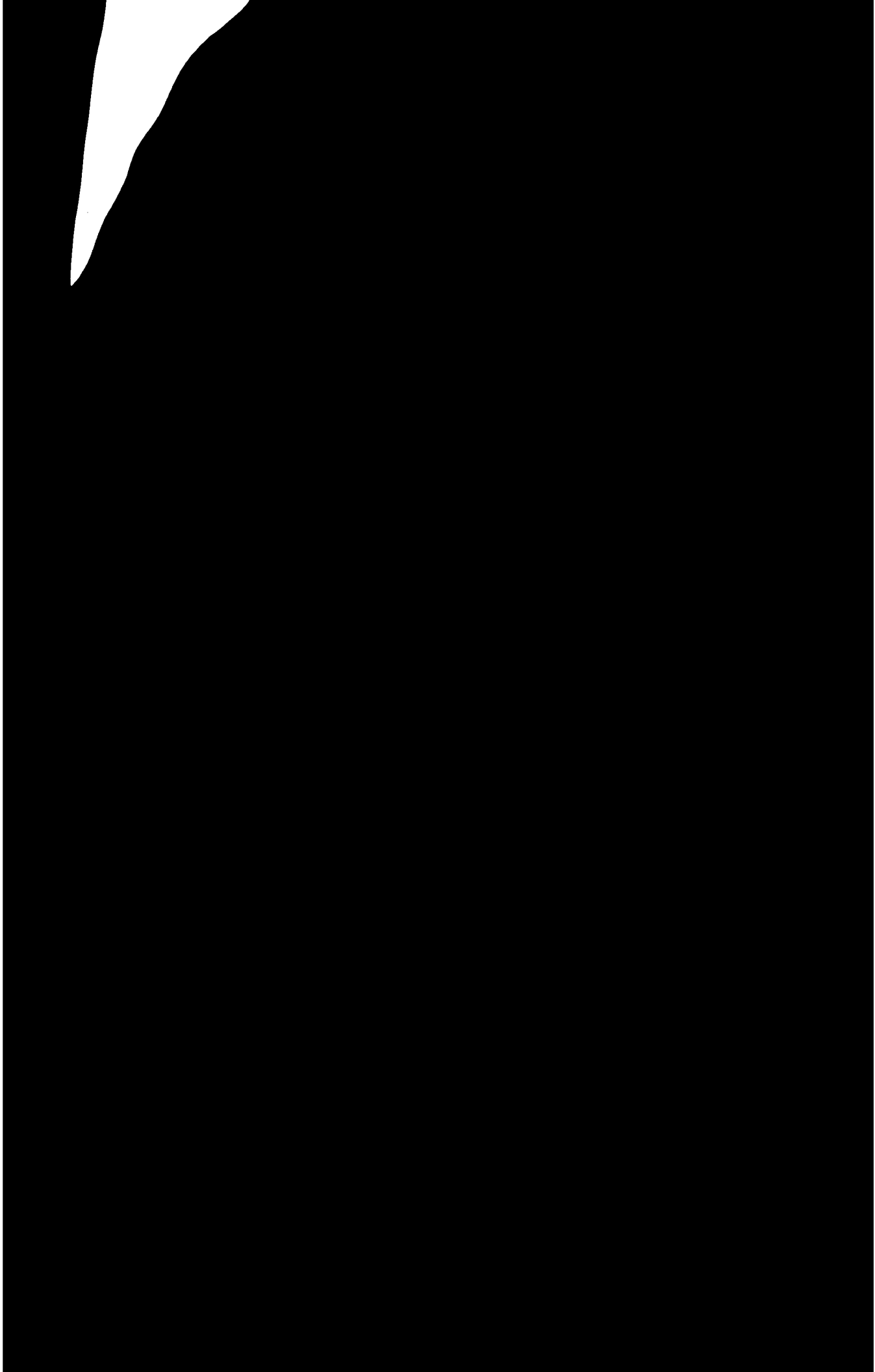

on the transparency and readings at these positions be taken. Then $$L_0 = L_a + \frac{\tau_n}{K'} \cdot C_n \cdot \sin \phi_n \quad (10)$$

$$L\frac{\pi}{2} = L_a - \frac{\tau_n}{K'} \cdot C_n \cdot \cos \phi_n \quad (11)$$

$$L\pi = L_a - \frac{\tau_n}{K'} \cdot C_n \cdot \sin \phi_n \quad (12)$$

$$L\frac{3\pi}{2} = L_a + \frac{\tau_n}{K'} \cdot C_n \cdot \cos \phi_n \quad (13)$$

From Equations 10, 11, 12, 13, it follows that $$A_n = -C_n \cdot \sin \phi_n = \frac{K'}{2\tau_n} \cdot (L\pi - L_0) \quad (14)$$

$$B_n = C_n \cdot \cos \phi_n = \frac{K'}{2\tau_n} \cdot \left(L\frac{3\pi}{2} - L\frac{\pi}{2}\right) \quad (15)$$

thus giving the coefficients of the sine and cosine terms of the Fourier series.

Figure 2:
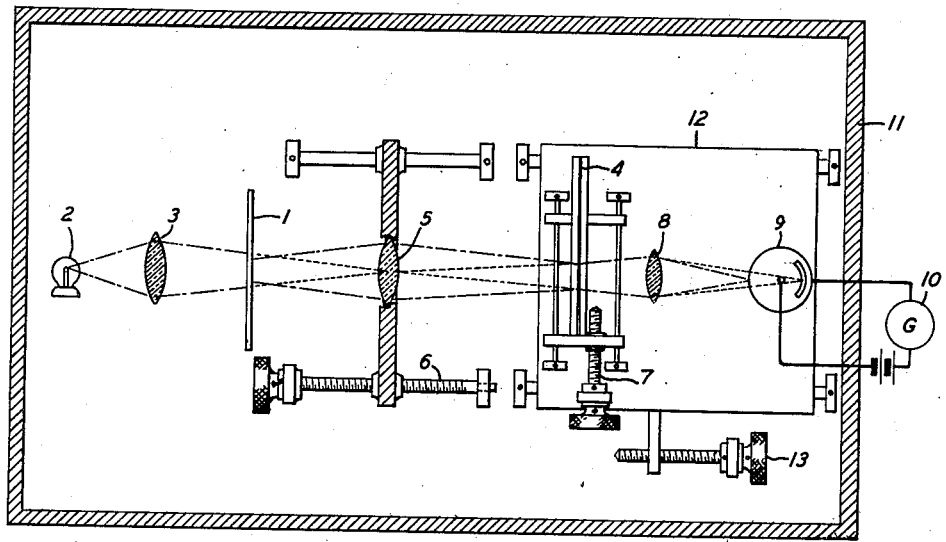

Fig. 2 diagrammatically illustrates a device embodying the invention. The invention is not in any manner limited to the specific device illustrated in Fig. 2 and many modifications of the device may obviously be made without departing from the spirit of the invention.

A transparency 1 bearing the given curve is uniformly illuminated by light from the source 2, condensed by the lens system 3. To obtain uniformity of illumination of the transparency 1, the light source 2 may conveniently be a ribbon filament or pointolite lamp and the lens system 3 may project an image which is larger than the transparency 1. A transparency 4 carries the modulating function of Equation 5, of the proper order for the desired harmonic. A lens system 5 projects an image of the light from the transparency 1 on the transparency 4. The size of the image may be adjusted by known means, indicated by the screw 6.

In Fig. 2, the transparency 1 is directly illuminated by the source 2, and produces an image on the modulating transparency 4. The positions of the transparencies may be interchanged so that the modulating transparency is directly illuminated and produces an image on the transparency 1 without changing the results so long as the beam of light is doubly modulated by both transparencies.

The transparency 4 may be shifted laterally by any suitable means, such as the micrometer screw 7. The doubly modulated light is collected by the lens system 8 and impressed on the light sensitive device 9. The meter 10 reads the output of the device 9. A light proof housing 11 encloses the various elements and prevents extraneous light from affecting the device 9.

The transparency 4, lens 8 and photoelectric cell 9 may be mounted on a frame 12 which may be moved along the optical axis of the lens systems by a screw 13.

An image of the light source 2 is preferably formed by the lens 3 on the lens 5. Under these circumstances, the interposition of the transparency 1 in the beam of light will not change the size of the image formed at the lens 5, but only the intensity of the light. Greater accuracy of the measurements will be attained by this adjustment. As the focus for this relationship is not particularly sharp, a small movement of the lens 5 will not destroy the relationship. Similarly, the lens 8 may form an image of the illuminated area of the lens 5 on the surface of the photoelectric cell 9. The interposition of the transparency 4 in the beam of light will not change the area of this image, but only the intensity of the light uniformly over the area of the image. Thus, the same area of the surface of the photoelectric cell is illuminated at all times and the effect of variations in the sensitivity of the surface is eliminated. The lens 5 should form an accurate image of the light from the transparency 1 on the transparency 4. The size of this image may be accurately adjusted by the conjoint axial movement of the lens 5 and the frame 12. The small movement of the lens 8 with the frame 12 will not materially change the size of the image of the lens 5 formed on the surface of the photoelectric cell.

A modulating transparency 4, of the proper order, is required for each harmonic to be determined. Thus, for the analysis of a given curve to the thirtieth harmonic, thirty modulating transparencies are required. These transparencies may be placed in order on a flexible film, or, separate transparencies may be arranged on the periphery of a rotatable drum and successively brought into the beam.

What is claimed is:

1. The method of analyzing a given curve which comprises preparing a transparency having a coefficient of transmission varying laterally in accordance with the variations in one period of the curve, preparing a second transparency having a vertically constant coefficient of transmission varying laterally in accordance with a sinusoidal function having a period which is an integral part of the period of the curve, optically aligning both said transparencies in a uniform beam of radiant energy, detecting the total radiant energy transmitted through both transparencies, shifting said second transparency until the total radiant energy transmitted is a maximum, measuring said maximum, again shifting said second transparency until the total radiant energy transmitted is a minimum, measuring said minimum, and determining the magnitude of a harmonic of said curve from said readings.

2. The method of analyzing a given curve which comprises preparing a transparency having a coefficient of transmission varying laterally in accordance with the variations in one period of the curve, preparing a second transparency having a vertically constant coefficient of transmission varying laterally in accordance with a sinusoidal function having a period which is an integral part of the period of the curve, marking said second transparency to indicate a known value of said sinusoidal function, optically aligning both said transparencies in a uniform beam of radiant energy, detecting the total radiant energy transmitted through both transparencies, shifting said second transparency until the total radiant energy is a maximum, measuring the position of said mark with respect to the period of said curve, and determining the phase of a harmonic of said curve from said measurement.

3. The method of determining the coefficients of the sine terms of the Fourier series expressing the lateral variations in transmission of a transparency which comprises modulating a uniform beam of radiant energy in accordance with an integral number of cycles of said variations, successively modulating said beam in accordance with a sinusoidal function having a period which is an integral part of a period of said variations, adjusting said second modulation until the phase of said second modulation is successively zero, and two right angles with respect to said variations, measuring the doubly modulated radiant energy for each adjustment, and determining the sine term from the difference of said measurements.

4. The method of determining the coefficients of the cosine terms of the Fourier series expressing the lateral variations in transmission of a transparency which comprises modulating a uniform beam of radiant energy in accordance with an integral number of cycles of said variations, successively modulating said beam in accordance with a sinusoidal function having a period which is an integral part of a period of said variations, adjusting said second modulation until the phase of said second modulation is successively a right angle, and three right angles with respect to said variations, measuring the doubly modulated radiant energy for each adjustment and determining the cosine term from the difference of said measurements.

5. A harmonic analyzer comprising a transparency varying laterally in transmission in accordance with an integral number of cycles of the given curve, a second transparency having a vertically constant transmission varying laterally in accordance with a sinusoidal function having a period which is an integral part of the period of said curve optically aligned with said first transparency, a beam of light of uniform intensity successively modulated by both said transparencies, means for shifting said second transparency laterally in said beam and a light sensitive device for detecting and measuring said doubly modulated light whereby the coefficient of the harmonic components of the variations in said first transparency may be determined.

EDWARD C. WENTE.